United States Patent
Barini et al.

(10) Patent No.: US 6,562,904 B2
(45) Date of Patent: May 13, 2003

(54) POLYALKENE-SUBSTITUTED CARBOXYLIC ACID COMPOSITIONS HAVING REDUCED CHLORINE CONTENT

(75) Inventors: Geraldo Barini, Leghorn (IT); Sanjeev Sharma, Oxon (GB); Jeremy R. Spencer, Oxfordshire (GB); Michael T. Minotti, Summit, NJ (US); Antonio Gutierrez, Mercerville, NJ (US); William M. Davis, Westfield, NJ (US); Robert A. Kleist, Bayonne, NJ (US)

(73) Assignee: Infineum International Ltd. (GB)

( * ) Notice: Subject to any disclaimer, the term of this patent is extended or adjusted under 35 U.S.C. 154(b) by 26 days.

(21) Appl. No.: 09/888,722

(22) Filed: Jun. 25, 2001

(65) Prior Publication Data

US 2003/0018133 A1 Jan. 23, 2003

(51) Int. Cl.[7] .................. C08F 267/02; C08F 267/04; C08C 19/14
(52) U.S. Cl. .................. 525/129; 525/215; 525/213; 525/214; 525/244; 525/285; 525/298; 525/301
(58) Field of Search .................. 525/129, 215, 525/213, 214, 244, 285, 298, 301

(56) References Cited

U.S. PATENT DOCUMENTS

| | | | |
|---|---|---|---|
| 3,215,707 A | 11/1965 | Rense | 260/326.3 |
| 3,219,666 A | 11/1965 | Norman et al. | 260/268 |
| 3,231,587 A | 1/1966 | Rense | 260/346.8 |
| 4,069,162 A | 1/1978 | Gardiner et al. | 252/32.7 E |
| 4,234,435 A | 11/1980 | Meinhardt et al. | 252/51.5 A |
| 5,489,390 A | 2/1996 | Sivik et al. | 252/58 |
| 5,624,999 A | 4/1997 | Lombardi et al. | 525/52 |
| 5,672,266 A | 9/1997 | Sivik et al. | 208/262.1 |
| 5,777,025 A | 7/1998 | Spencer et al. | 524/745 |
| 5,885,944 A | 3/1999 | Pudelski et al. | 508/306 |
| 6,077,909 A | 6/2000 | Pudelski et al. | 525/285 |
| 6,165,235 A | * 12/2000 | Kolp et al. | |

FOREIGN PATENT DOCUMENTS

| | | | |
|---|---|---|---|
| CA | 1335895 | 6/1995 | C07C/57/13 |
| EP | 0014288 A1 | 8/1980 | C08F/8/46 |
| EP | 0382450 B1 | 8/1990 | C08F/8/22 |
| EP | 0665242 B1 | 8/1995 | C08F/8/26 |
| EP | 0684262 A2 | 11/1995 | C08F/8/46 |
| EP | 0808852 A2 | 11/1997 | C08F/8/26 |
| EP | 0859042 A1 | 8/1998 | C10M/129/93 |
| EP | 0899276 A1 | 3/1999 | C08F/8/46 |

* cited by examiner

Primary Examiner—James J. Seidleck
Assistant Examiner—Olga Asinovsky

(57) ABSTRACT

The residual chlorine content of a polyolefin-substituted carboxylic acylating agent formed by a chlorine-assisted reaction of a polyolefin and an α,β-unsaturated carboxylic reactant can be reduced by heating the polyolefin-substituted carboxylic acylating agent having a residual chlorine content in the presence of an α,β-unsaturated carboxylic reactant, optionally in the further presence of a sulfonic acid. Residual chlorine content can be further reduced by using, in the reaction of the polyolefin α,β-unsaturated carboxylic reactant, a high speed mixer provided with a dual pitch blade.

22 Claims, 1 Drawing Sheet

POLYALKENE-SUBSTITUTED CARBOXYLIC ACID COMPOSITIONS HAVING REDUCED CHLORINE CONTENT

FIELD OF THE INVENTION

The invention is directed to polyalkene-substituted carboxylic acid compositions having a reduced chlorine content, derivatives thereof useful as fuel and lubricating oil dispersants and dispersant/viscosity modifiers and methods for forming such compositions.

BACKGROUND OF THE INVENTION

Compositions formed by reacting polyalkene-substituted carboxylic acylating agents with amines, alcohols and/or reactive metal compounds are known to be useful additives that provide fuel and lubricating oils with improved dispersing, detergent and/or viscometric properties. The polyalkene-substituted carboxylic acylating agents are themselves useful as emulsifiers. Such polyalkene-substituted carboxylic acylating agents are commonly formed by halogen-assisted reaction of a polyalkene and a carboxylic acylating agent. In a two-step process, as described for example, in U.S. Pat. No. 3,219,666, a polyalkene is chlorinated until there is, on average, at least one chloro group for each polyalkene molecule. Chlorination can be achieved by simply contacting the polyalkene with chlorine gas until the desired amount of chlorine is incorporated into the chlorinated polyalkene, usually at a temperature of about 75 to about 125° C. In the second step of the two-step chlorination process, the chlorinated polyalkene is reacted with a molar equivalent, or a molar excess of an $\alpha,\beta$-unsaturated carboxylic group, usually at a temperature of about 100 to about 200° C. Alternatively, and as described for example by U.S. Pat. Nos. 3,215,707 and 3,231,587, a mixture of polyalkene and $\alpha,\beta$-unsaturated carboxylic reactant can, in a single step process, be contacted with chlorine gas (e.g., by passing chlorine gas through the mixture with agitation) at an elevated temperature (e.g., 140° C. or above).

Polyalkene-substituted $\alpha,\beta$-unsaturated carboxylic acylating agents synthesized via chlorine induced condensation of polyalkenes and $\alpha,\beta$-unsaturated carboxylic groups conventionally contain a residual chlorine content of 0.5 to 1%, which corresponds to 5,000 to 10,000 parts per million of chlorine. Thus, dispersants derived from polyalkene-substituted carboxylic acylating agents are a source of organochlorine in motor oils. Due to environmental concerns regarding the disposal of used motor oil, particularly in Europe, it has become desirable to eliminate or reduce the level of chlorine in motor oil additives and other industrial products. One way to address concerns regarding chlorine is to avoid the use of chlorine altogether by using a thermal process wherein a polyolefin and unsaturated dicarboxylic acid are heated together without halogen assistance, optionally in the presence of a catalyst ("thermal" or "ene" reaction). Such a method is described, for example, in U.S. Pat. No. 3,361,673. However materials formed via the thermal route, in general, have a lower number of acylating groups per molecule. Another solution to the problem is to post-treat a chlorine-containing product to remove chlorine until the level of chlorine in the product is at an acceptable level. Certain methods for accomplishing this are known, particularly with polyalkene succinic dicarboxylic acid or anhydride (PIBSA) used as an intermediate in the manufacture of PIBSA/PAM (polyamine derivatives of PIBSA) dispersants. These methods, while capable of reducing chlorine content of PIBSA, can also adversely reduce the number of acylating groups, as expressed by a reduced saponification (SAP) number or level of active ingredient (AI). Also known are methods for obtaining dispersant intermediates by reacting highly functionalized polymer with acylating agents by maleation and chlorination of a polymer (e.g., polyalkene) backbone. However, these methods lead to the need for filtration due to high levels of tar. Processes that require filtration are less acceptable for both economic and environmental reasons.

U.S. Pat. No. 5,489,390 to Sivik et al. describes a process for reducing the chlorine content of an organochlorine compound in which the organochlorine compound is mixed with (a) an acid selected from mineral acids other than HI and HBr, and organic acids having a pKa of less than about 2; and (b) a source of iodine or bromine, for a period of time sufficient to reduce the chlorine content of the compound. Chlorine levels in the compound may be reduced by treatment with iodine and bromine compounds. However, as a result, both halogens are present in the final product. Further, as would be apparent to one of ordinary skill in the art, the post treatment of dicarboxylic systems with mineral acids can lead to decarboxylation as well as the degradation of the polymer.

U.S. Pat. No. 5,672,266 to Sivik et al. discusses a process for reducing chlorine content by post thermal treatment, as in U.S. Pat. No. 5,489,390, using a Lewis acid in the absence of organic carbon. The Lewis acid is selected from salts of zinc, magnesium, calcium, iron, copper, boron, aluminum, tin, titanium and mixtures thereof. The low-chlorine-content products formed by said process again contain halogen other than chlorine, such as bromine or iodine.

U.S. Pat. No. 5,885,944 to Pudelski et al. (and EP 0 808 852) describes a method of reducing chlorine content by post treatment with elemental sulfur of polyalkylene-substituted carboxylic acylating agents which contain chlorine remaining from the chlorine induced condensation of polyalkenes and $\alpha,\beta$-unsaturated carboxylic acid moieties. The described method results in the formation of hydrogen sulfide as a by-product and a sulfur-containing PIBSA, which displays a high kinematic viscosity.

U.S. Pat. No. 6,077,909 to Pudelski et al. and EP 0 899 276 each describes a method for providing polyalkylene-substituted carboxylic acylating agents having a reduced chlorine content which relies on the use of, as the polyalkene reactant, a polyolefin having a total of tetra- and tri-substituted unsaturated end groups in an amount up to about 90 mole percent, wherein the polyolefin is reacted with halogen on a molar basis up to an amount equal to the moles of tetra- and tri-substituted end groups.

EP 0 684 262 describes a process for reducing the chlorine content of chlorinated polypropylene or polyisobutylene, or a mixture of polypropylene and polypropylene succinic anhydride or polyisobutylene and polyisobutylene and polyisobutylene succinic anhydride in which the polymer or polymer and succinic anhydride mixture is treated with heat for a specified period of time.

EP 0 665 242 describes a method for reducing the chlorine content of polyalkene substituted carboxylic acylating agents which involve treatment with a halogen other than chlorine (e.g., iodine or bromine).

U.S. Pat. No. 5,777,025 to Spencer et al. and EP 0 014 288 describe a method of reducing the amount of sediment that results from a thermal, or ene reaction of polyolefin and unsaturated dicarboxylic acid in which the reaction is conducted in the presence of a small amount of a strong organic acid, such as a hydrocarbyl-substituted sulfonic acid.

SUMMARY OF THE INVENTION

In accordance with one aspect of the present invention, there is provided a method of reducing the chlorine content of a polyolefin-substituted carboxylic acylating agent having a residual chlorine content in which the polyolefin-substituted carboxylic acylating agent is subjected to heat-soaking in the presence of an α,β-unsaturated acid or anhydride.

In accordance with another aspect of the present invention, there is provided a method of reducing the chlorine content of a polyolefin-substituted carboxylic acylating agent having a residual chlorine content in which the polyolefin-substituted carboxylic acylating agent is subjected to heat soaking in the presence of an α,β-unsaturated acid or anhydride and a sediment reducing agent.

In accordance with a third aspect of the invention, there is provided a method of further reducing the chlorine content of a product of a chlorine-assisted reaction of a polyolefin and α,β-unsaturated acid or anhydride reactant which involves mixing the reactants using mixer blade(s) having a specific configuration.

Polyolefin-substituted carboxylic acylating agents formed in accordance with the method of the present invention, in addition to a lower residual chlorine content, can simultaneously provide a higher saponification number with succination values up to about 2 and an increased level of active ingredient (A.I.) and sediment values that are reduced to levels at which filtration of the final product is not required.

DETAILED DESCRIPTION OF THE INVENTION

Figure 1:
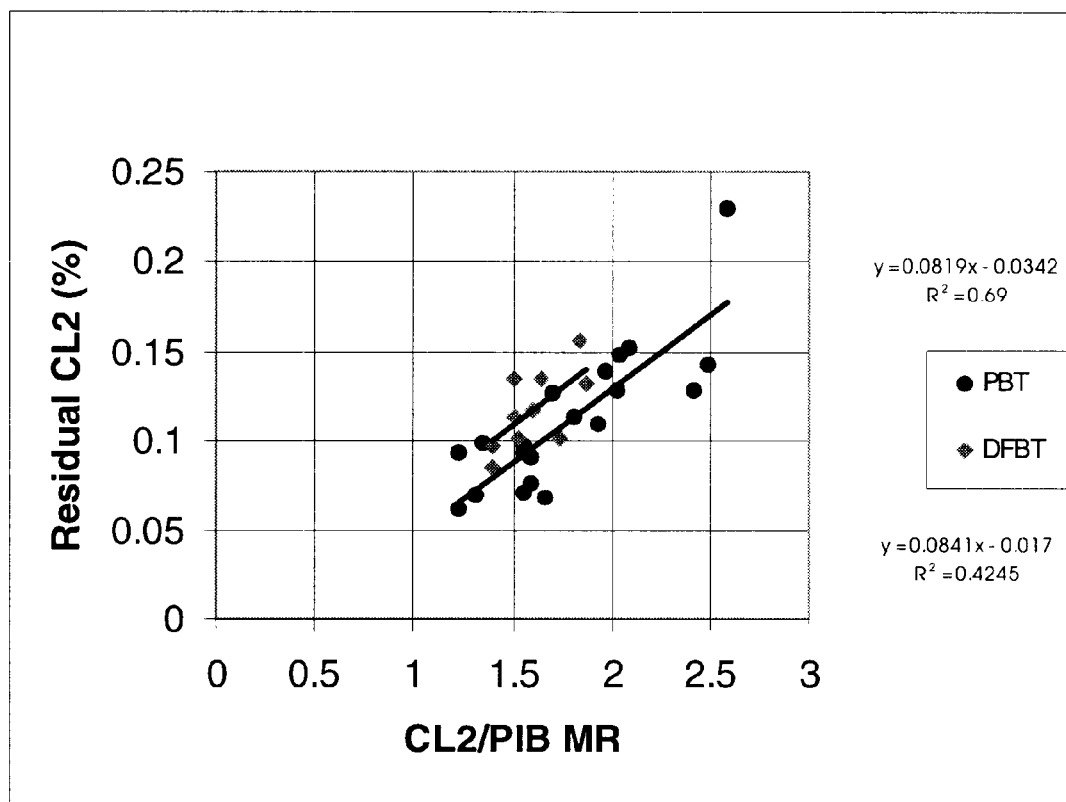
FIG. 1 is a graph plotting residual chlorine content as a function of chlorine to polymer ratio for reactants mixed with each of a dual pitched blade system and a pitched blade/disk flat blade turbine system.

Suitable hydrocarbons or polymers employed in this invention include homopolymers, interpolymers or lower molecular weight hydrocarbons. One family of such polymers comprises ethylene and/or at least one $C_3$ to $C_{28}$ alpha-olefin having the formula $H_2C=CHR^1$ wherein $R^1$ is straight or branched chain alkyl radical comprising 1 to 26 carbon atoms and wherein the polymer contains carbon-to-carbon unsaturation, preferably a high degree of terminal ethenylidene unsaturation. Such polymers may comprise interpolymers of ethylene and at least one alpha-olefin of the above formula, wherein $R^1$ is alkyl of from 1 to 18 carbon atoms, and more preferably is alkyl of from 1 to 8 carbon atoms, and more preferably still of from 1 to 2 carbon atoms. Therefore, useful alpha-olefin monomers and comonomers include, for example, propylene, butene-1, hexene-1, octene-1, 4-methylpentene-1, decene-1, dodecene-1, tridecene-1, tetradecene-1, pentadecene-1, hexadecene-1, heptadecene-1, octadecene-1, nonadecene-1, and mixtures thereof (e.g., mixtures of propylene and butene-1, and the like). Exemplary of such polymers are propylene homopolymers, butene-1 homopolymers, ethylene-propylene copolymers, ethylene-butene-1 copolymers and the like, wherein the polymer contains at least some terminal and/or internal unsaturation. Preferred polymers are unsaturated copolymers of ethylene and propylene and ethylene and butene-1. The interpolymers of this invention may contain a minor amount, e.g. 0.5 to 5 mole % of a $C_4$ to $C_{18}$ non-conjugated diolefin comonomer. However, it is preferred that the polymers of this invention comprise only alpha-olefin homopolymers, interpolymers of alpha-olefin comonomers and interpolymers of ethylene and alpha-olefin comonomers. The molar ethylene content of the polymers employed in this invention is preferably in the range of 20 to 80%, and more preferably 30 to 70%. When propylene and/or butene-1 are employed as comonomer(s) with ethylene, the ethylene content of such copolymers is most preferably between 45 and 65%, although higher or lower ethylene contents may be present.

These polymers may be prepared by polymerizing alpha-olefin monomer, or mixtures of alpha-olefin monomers, or mixtures comprising ethylene and at least one $C_3$ to $C_{28}$ alpha-olefin monomer, in the presence of a catalyst system comprising at least one metallocene (e.g., a cyclopentadienyl-transition metal compound) and an aluminoxane compound. Using this process, a polymer in which 95% or more of the polymer chains possess terminal ethenylidene-type unsaturation can be provided. The percentage of polymer chains exhibiting terminal ethenylidene unsaturation may be determined by FTIR spectroscopic analysis, titration, or $C^{13}$ NMR. Interpolymers of this latter type may be characterized by the formula POLY-C($R^1$)=$CH_2$ wherein $R^1$ is $C_1$ to $C_{26}$ alkyl, preferably $C_1$ to $C_{18}$ alkyl, more preferably $C_1$ to $C_8$ alkyl, and most preferably $C_1$ to $C_2$ alkyl, (e.g., methyl or ethyl) and wherein POLY represents the polymer chain. The chain length of the $R^1$ alkyl group will vary depending on the comonomer(s) selected for use in the polymerization. A minor amount of the polymer chains can contain terminal ethenyl, i.e., vinyl, unsaturation, i.e. POLY-CH=$CH_2$, and a portion of the polymers can contain internal monounsaturation, e.g. POLY-CH=CH($R^1$), wherein $R^1$ is as defined above. These terminally unsaturated interpolymers may be prepared by known metallocene chemistry and may also be prepared as described in U.S. Pat. Nos. 5,498,809; 5,663,130; 5,705,577; 5,814,715; 6,022,929 and 6,030,930.

Another useful class of polymers include is polymers prepared by cationic polymerization of isobutene, styrene, and the like. Common polymers from this class include polyisobutenes obtained by polymerization of $C_4$ refinery stream having a butene content of about 35 to about 75% by wt., and an isobutene content of about 30 to about 60% by wt., in the presence of a Lewis acid catalyst such as aluminum trichloride or boron trifluoride. A preferred source of monomer for making poly-n-butenes is petroleum feedstreams such as Raffinate II. These feedstocks are disclosed in the art such as in U.S. Pat. No. 4,952,739. Polyisobutylene is a most preferred backbone of the present invention because it is readily available by cationic polymerization from butene streams (e.g., using $AlCl_3$ catalysts). Such polyisobutylenes generally contain residual unsaturation in amounts of about one ethylenic double bond per polymer chain, positioned along the chain.

Polyisobutylene polymers, when employed, are generally based on hydrocarbon chains having a number average molecular weight of from about 900 to about 2,300. Methods for making polyisobutylene are well known.

Processes for reacting polymeric hydrocarbons with unsaturated carboxylic acids, anhydrides or esters and the preparation of derivatives from such compounds are disclosed in U.S. Pat. Nos. 3,087,936; 3,172,892; 3,215,707; 3,231,587; 3,272,746; 3,275,554; 3,381,022; 3,442,808; 3,565,804; 3,912,764; 4,110,349; 4,234,435; and GB-A-1, 440,219. U.S. Pat. No. 4,234,435 describes a process for performing such a reaction whereby the resulting polyolefin-substituted carboxylic acylating agent will have, on average, at least 1.3 carboxylic groups per molecule. Because the carboxylic group "functionalizes" the molecule (provides a site for further reaction with, for example, an amine or hydroxyl group), such products can be described as having a "functionality" of at least 1.3. The degree of functionality can also be expressed as a saponification number. The saponification number indicates the milligrams of KOH needed to completely saponify one gram of PIBSA. Saponification can be defined as the reaction of an acid or anhydride with an alkali base to form a metal carboxylate of the acid or anhydride. A reaction product of polyisobutylene (molecular weight of 2225, A.I. of 86%) and maleic anhydride in the presence of chlorine (PIBSA) having a functionality of about 1.3 will have a saponification number of about 55. In contrast, such a reaction product having a functionality of about 1 will have a saponification number of about 48.

The polymer or hydrocarbon may be functionalized, with carboxylic acid producing moieties (preferably acid or anhydride) by reacting the polymer or hydrocarbon under conditions that result in the addition of functional moieties or agents (e.g., the acid, anhydride or ester moieties) onto the polymer or hydrocarbon chains, primarily at sites of carbon-to-carbon unsaturation (also referred to as ethylenic or olefinic unsaturation) using a halogen assisted functionalization process. Functionalization is accomplished by halogenating, e.g., chlorinating or brominating the unsaturated α,β-olefin polymer to about 1 to 8 wt. %, preferably 3 to 7 wt. % chlorine, or bromine, based on the weight of polymer or hydrocarbon, by passing the chlorine or bromine through the polymer at a temperature of 60 to 250° C., preferably 110 to 180° C., e.g., 120 to 140° C., for about 0.5 to 10, preferably 1 to 7 hours. The halogenated polymer or hydrocarbon (hereinafter backbones) can then be reacted with sufficient monounsaturated reactant capable of adding functional moieties to the backbone, e.g., monounsaturated carboxylic reactant, at a temperature of from about 100 to 250° C., such as from about 180° C. to 250° C., preferably from about 180° C. to 235° C., and for a time of about 0.5 to 10 hours (e.g., 3 to 8 hours), or until the product obtained contains the desired number of moles of the monounsaturated carboxylic reactant per mole of halogenated backbone. Alternatively, the backbone and the monounsaturated carboxylic reactant can be mixed and heated while adding chlorine to the hot material. Preferably, the functionalized backbone is formed by contacting the hydrocarbon and carboxylic acid producing moieties as chlorine is introduced into the reaction mixture, while the reaction temperature is slowly raised from about 100° C. to about 180 to 250° C. (e.g., 220° C.). In this preferred process, at least about 70% of the chlorine may be added before the reaction temperature reaches 170° C.

Preferred monounsaturated reactants used to functionalize the backbone comprise mono- and dicarboxylic acid material, i.e., acid, anhydride, or acid ester material, including (i) monounsaturated $C_4$ to $C_{10}$ dicarboxylic acid wherein (a) the carboxyl groups are vicinyl, (i.e., located on adjacent carbon atoms) and (b) at least one, preferably both, of said adjacent carbon atoms are part of said mono unsaturation; (ii) derivatives of (i) such as anhydrides or $C_1$ to $C_5$ alcohol derived mono- or diesters of (i); (iii) monounsaturated $C_3$ to $C_{10}$ monocarboxylic acid wherein the carbon-carbon double bond is conjugated with the carboxyl group, i.e., of the structure —C=C—CO—; and (iv) derivatives of (iii) such as $C_1$ to $C_5$ alcohol derived mono- or diesters of (iii). Mixtures of monounsaturated carboxylic materials (i)–(iv) also may be used. Upon reaction with the backbone, the monounsaturation of the monounsaturated carboxylic reactant becomes saturated. Thus, for example, maleic anhydride becomes backbone-substituted succinic anhydride, and acrylic acid becomes backbone-substituted propionic acid. Exemplary of such monounsaturated carboxylic reactants are fumaric acid, itaconic acid, maleic acid, maleic anhydride, chloromaleic acid, chloromaleic anhydride, acrylic acid, methacrylic acid, crotonic acid, cinnamic acid, and lower alkyl (e.g., $C_1$ to $C_4$ alkyl) acid esters of the foregoing, e.g., methyl maleate, ethyl fumarate, and methyl fumarate. The monounsaturated carboxylic reactant, preferably maleic anhydride, typically will be used in an amount ranging from about 0.01 to about 20 wt. %, preferably 0.5 to 10 wt. %, based on the weight of the polymer or hydrocarbon.

Conventional polyisobutylene has about 4 to 5 mol. % vinylidene, 0–2 mol. % vinyl, 63–67 mol. % tri-substituted and about 20 to 30 mol. % tetra-substituted end groups. The vinylidene and vinyl double bonds do not readily add chlorine under the contemplated reaction conditions. The vinylidene and vinyl double bonds do not readily react with the chlorine under such reaction conditions. About 80 to 90 mol. % of the tri- and tetra-substituted unsaturated end groups react with chlorine during the acidification process to produce mostly short-lived intermediate chlorinated polyisobutene. As a result of random chlorination, residual chlorine can be found on the polymer at locations in which the maleic anhydride addition fails to eliminate the chlorine. As the reaction proceeds simultaneously with maleation, maleic anhydride mono-succinated polymer is first obtained, followed by bis-succination/chlorination on newly formed double bonds resulting from HCl elimination. Some polymer having remaining labile allylic chlorine from the tri-/tetra-substituted double bonds, some polymer with chlorine in the backbone, and some polymer containing unreacted double bonds is included in the resulting PIBSA product. Polyolefin-substituted carboxylic acylating agent formed by the chlorine-assisted functionalization reaction described above may contain up to, or in excess of, 2000 ppm of chlorine. To reduce this residual chlorine content, the polyolefin-substituted carboxylic acylating agent having residual chlorine is contacted with a small amount of additional α,β-unsaturated carboxylic reactant.

This additional amount of α,β-unsaturated carboxylic reactant may range from 0.1 to 10%, preferably from 0.5 to 5 wt. %, most preferably from 1 wt. % to 3%, based on the weight of polyolefin-substituted carboxylic acylating agent. The resulting mixture is then soaked, with no further addition of chlorine, at an elevated temperature, such as 180° C. to 250° C., preferably 190° C. to 230° C., most preferably 200 to 220° C. for a time sufficient to allow additional α,β-unsaturated carboxylic reactant to displace unreacted labile allylic chloride via a Diels Alder mechanism. Soaking at elevated temperature may also cause some of the of α,β-unsaturated carboxylic reactant to further react with unreacted double bonds in the polymer backbone of the polyolefin-substituted carboxylic acylating agents via an "ene" mechanism, which results in a higher level of functionalization. The mechanisms of both the Diels Alder and ene reaction are well known to those of ordinary skill in the art and a further description thereof should not be necessary.

The additional amount of α,β-unsaturated carboxylic reactant needed to reduce the chlorine content of the polyolefin-substituted carboxylic acylating agent may be added after the initial halogen-assisted reaction of the polymer and α,β-unsaturated carboxylic reactant. Alternatively, the additional amount of α,β-unsaturated carboxylic reactant is charged to the reactor as an excess of α,β-unsaturated carboxylic reactant prior to or during the formation of the halogen-assisted initial reaction of the polymer and α,β-unsaturated carboxylic reactant.

When charging the additional amount of α,β-unsaturated carboxylic reactant to the reactor subsequent to the halogen-assisted reaction of the polymer and α,β-unsaturated carboxylic reactant (post-treatment), the "additional" amount is defined as an amount of from about 0.1%, to about 10%, preferably from about 0.5% to about 5%, most preferably from about I to 3% based on the weight of starting polymer/ and α,β-unsaturated carboxylic moiety reaction product. Such post-treatment can be conducted at atmospheric pressure, or at an elevated pressure. Where an elevated pressure is used, the pressure may be up to 5 atmospheres or higher, preferably up to about 3 atmospheres.

When charging the additional amount of α,β-unsaturated carboxylic reactant to the reactor prior to or during the halogen-assisted initial reaction of the polymer and α,β-unsaturated carboxylic reactant, the "additional" amount is defined as an amount of from about 0.1 to about 10%, preferably from about 0.5 to about 5%, most preferably from about 1 to 3% in excess of the weight of α,β-unsaturated carboxylic reactant needed to form a polyolefin-substituted carboxylic acylating agent having the targeted level of functionality.

Thus, in one preferred process, the functionalized backbone is formed by contacting the hydrocarbon and an excess amount carboxylic acid producing moieties as chlorine is introduced into the reaction mixture and while the reaction temperature is slowly raised from about 100° C. to about 220° C., with at least about 70% of the chlorine being added before the reaction temperature reaches 170° C., and allowing the resulting mixture of polyolefin-substituted carboxylic acylating agent and excess α,β-unsaturated carboxylic reactant to soak, with no further addition of chlorine, at an elevated temperature, such as 180° C. to 250° C., preferably 190° C. to 230° C., most preferably 200 to 220° C. for a time sufficient to allow additional α,β-unsaturated carboxylic reactant to displace unreacted labile allylic chloride via a Diels Alder mechanism.

In addition to providing a reduced chlorine content and higher level of functionality and activity, it has also been found that treatment with excess α,β-unsaturated carboxylic reactant reduces the formation of sediment to a level at which filtration of the product and/or addition of sediment-reducing agents becomes unnecessary. Further, when a sediment reducing agent is used, it has been found that the excess α,β-unsaturated carboxylic reactant interacts synergistically with the sediment reducing agent and that heat soaking in the presence of the excess α,β-unsaturated carboxylic reactant and a small amount of sediment reducing agent provides a product that is substantially free of sediment (less than 0.08% wt. %, preferably below 0.03 wt. %, such as from 0.01 to 0.03 wt. % sediment).

Sediment reducing agents suitable for use include oil soluble strong organic acids, preferably oil soluble hydrocarbyl substituted sulfonic acids. An "oil soluble" hydrocarbyl-substituted sulfonic acid is one that is at least 50 wt. % soluble in mineral oil at 20° C. The hydrocarbyl sulfonic acid may be a natural or synthetic sulfonic acid, such as a mahogany or petroleum alkyl sulfonic acid, an alkyl sulfonic acid or an alkaryl sulfonic acid, wherein the hydrocarbyl substituent (i.e., petroleum alkyl, linear and/or branched chain alkyl, alkaryl, and the like) imparts the oil-solubility. Oil-soluble mahogany acids may be obtained by treating lubricating oil basestocks with concentrated or fuming sulfuric acid.

The hydrocarbyl substituent of the sulfonic acid can contain non-hydrocarbon groups such as nitro, amino, halo (e.g., chloro or bromo), lower alkoxyl, lower alkyl mercapto, oxo (=O), thio (=S), imino (—NH—), ether (—O—), and thioether (—S—), provided the essentially hydrocarbon character of the substituent is retained for the purposes of this invention. When such non-hydrocarbon groups are present, they will generally represent no more than about 10 wt. % of the total weight of the atoms in the hydrocarbyl substituent.

The preferred hydrocarbyl substituent is alkaryl, and the preferred sulfonic acids are accordingly alkaryl sulfonic acids. Alkaryl sulfonic acids can be obtained by sulfonating alkyl substituted aromatic hydrocarbons such as those obtained from the fractionation of petroleum by distillation and/or extraction, or by the alkylation of aromatic hydrocarbons as, for example, those obtained by alkylating benzene, toluene, xylene, naphthalene, and biphenyl. Preferred alkaryl sulfonic acids include those obtained by the sulfonation of hydrocarbons prepared by the alkylation of benzene or toluene with tri-, tetra- or pentapropene fractions resulting from propene polymerization.

The alkaryl sulfonic acids typically contain from 15 to 76, preferably from 24 to 40, and more preferably from 28 to 36 total carbon atoms. The aryl moiety can be derived from any aromatic hydrocarbon such as benzene, naphthalene, anthracene, biphenyl, and the like, but is preferably derived from benzene or naphthalene, and is most preferably derived from benzene. The preferred alkyl benzenesulfonic acids typically contain from 9 to 70, preferably from 18 to 34, more preferably from 22 to 30 total carbon atoms in the alkyl substituent (or substituents) in the aryl moiety. Particularly preferred is an alkylated benzenesulfonic acid having a $\overline{M}_n$ of from 475 to 600 and an average of 2 alkyl groups wherein each of the alkyl groups contains an average of 11 to 15 carbon atoms.

The alkylated benzene used for preparing the sulfonic acid is obtained by known alkylation processes; e.g., the benzene can be reacted with a suitable alkene or oligomer or polymer thereof in the presence of boron trifluoride. Among the $C_9$ to $C_{70}$ alkylated benzenes which are preferably employed in the preparation of the sulfonic acid are nonylbenzene, dodecylbenzene, waxy alkylated benzenes, and benzenes alkylated with suitable branched chain polymers of up to 70 carbon atoms obtained from propene, butene, amylene or mixtures thereof or the like. Preferably, nonyl or dodecyl or either of their equivalents in a mixture of alkyls is employed in the preparation of the sulfonic acid.

The hydrocarbyl-substituted sulfonic acid is used in an amount effective for preventing or substantially reducing the formation of sediments for the selected reaction time and conditions. When used, the amount of sulfonic acid employed in the present invention is typically in the range of from about 0.05 to 1.0 wt. %, preferably 0.15 to 0.5 wt. % based on the total weight of the polyalkene and the dicarboxylic reactants.

It has further been found that chlorine content can be influenced by the speed and conditions under which the polyalkene and the dicarboxylic reactants are mixed in the reactor and the configuration of the mixer impeller blades. Specifically, it has been found that in mixing the reactants, the use of high speed mixing conditions and/or the use of dual-pitched blade(s) (compared to the use of a top-pitched mixing blade in combination with a bottom disk flat blade) will lead to further reductions in chlorine. Under high speed mixing conditions, the impeller to reactor diameter ratio should be maintained within a range of from about 0.2 to about 0.75, preferably from 0.3 to about 0.65, most preferably from about 0.35 to about 0.55. The mixer may be operated at speeds from about 70 rpm to about 1600 rpm, preferably from 140 rpm to about 1400 rpm, most preferably from about 200 rpm to about 1200 rpm. At these mixing speeds, approximately 5 to 100, preferably about 10 to about 94, more preferably about 15 to 65, such as 20 to 50, most preferably from about 30 to about 40 HP/1000 gallons of mixing energy is applied to the reactor contents. Further, under high speed, or other mixing conditions, it has been found that the use of a dual-pitched blade will lead to further reductions in chlorine compared to the use of a top-pitched mixing blade in combination with a bottom disk flat blade, when operated at a comparable speed. Under high speed mixing conditions, the use of a dual-pitched blade was found to provide a reduction in residual chlorine content of about 20% compared to a comparable mixer provided with the combination of a top-pitched mixing blade and a bottom disk flat blade.

To provide a dispersant suitable for use in fuels and lubricants, the polyolefin-substituted carboxylic acylating agent, as described supra, may then be further derivatized with a nucleophilic reactant, such as an amine, aminoalcohol, alcohol, metal compound, or mixture thereof, to form a corresponding derivative. Useful amine compounds for derivatizing functionalized polymers comprise at least one amine and can comprise one or more additional amine or other reactive or polar groups. These amines may be hydrocarbyl amines or may be predominantly hydrocarbyl amines in which the hydrocarbyl group includes other groups, e.g., hydroxyl groups, alkoxyl groups, amide groups, nitriles, imidazoline groups, and the like. Particularly useful amine compounds include mono- and polyamines, e.g., polyalkene and polyoxyalkylene polyamines of about 2 to 60, such as 2 to 40 (e.g., 3 to 20) total carbon atoms having about 1 to 12, such as 3 to 12, and preferably 3 to 9 nitrogen atoms per molecule. Mixtures of amine compounds may advantageously be used, such as those prepared by reaction of alkylene dihalide with ammonia. Preferred amines are aliphatic saturated amines, including, for example, 1,2-diaminoethane; 1,3-diaminopropane; 1,4-diaminobutane; 1,6-diaminohexane; polyethylene amines such as diethylene triamine; triethylene tetramine; tetraethylene pentamine and polypropyleneamines such as 1,2-propylene diamine; and di-(1,2-propylene) triamine.

Other useful amine compounds include: alicyclic diamines such as 1,4-di(aminomethyl) cyclohexane and heterocyclic nitrogen compounds such as imidazolines and alkylamine-substituted triazines, such as 2, 4, 6-trihexamethylenediamine triazine (TAHM) as described in U.S. patent application Ser. No. 09/432,739, allowed Dec. 4, 2000. Another useful class of amines is the polyamido and related amido-amines as disclosed in U.S. Pat. Nos. 4,857, 217; 4,956,107; 4,963,275; and 5,229,022. Also usable is tris(hydroxymethyl)amino methane (THAM) as described in U.S. Pat. Nos. 4,102,798; 4,113,639; 4,116,876; and UK 989,409. Dendrimers, star-like amines, and comb-structured amines may also be used. Similarly, one may use condensed amines, as described in U.S. Pat. No. 5,053,152 or "heavy polyamines", as described, for example, in any one of U.S. Pat. Nos. 5,565,128; 5,756,431; 5,792,730; or 5,854,186. The polyolefin-substituted carboxylic acylating agent can be reacted with the amine compound using conventional techniques as described, for example, in U.S. Pat. Nos. 4,234, 435 and 5,229,022, as well as in EP-A-208,560.

The polyolefin-substituted carboxylic acylating agent may also be derivatized with hydroxyl compounds such as monohydric and polyhydric alcohols, or with aromatic compounds such as phenols and naphthols. Preferred polyhydric alcohols include alkylene glycols in which the alkylene radical contains from 2 to 8 carbon atoms. Other useful polyhydric alcohols include glycerol, mono-oleate of glycerol, monostearate of glycerol, monomethyl ether of glycerol, pentaerythritol, dipentaerythritol, and mixtures thereof. An ester dispersant may also be derived from an unsaturated alcohol, such as allyl alcohol, cinnamyl alcohol, propargyl alcohol, 1-cyclohexane-3-ol, and oleyl alcohol. Still other classes of alcohols capable of -yielding ashless dispersants comprise ether-alcohols, including oxy-alkylene and oxy-arylene. Such ether-alcohols are exemplified by ether-alcohols having up to 150 oxy-alkylene radicals wherein the alkylene radical contains from 1 to 8 carbon atoms. The ester dispersants may be di-esters of succinic acids or acid-esters, i.e., partially esterified succinic acids, as well as partially esterified polyhydric alcohols or phenols, i.e., esters having free alcohol or phenolic hydroxyl radicals. An ester dispersant may be prepared by any one of several known methods as described, for example, in U.S. Pat. No. 3,381,022.

Particularly preferred ashless dispersants are those derived from polyisobutylene substituted with succinic anhydride groups and reacted with polyethylene amines, e.g., polyethylene diamine, tetraethylene pentamine; or a polyoxyalkylene polyamine, e.g., polyoxypropylene diamine, trimethylolaminomethane; a hydroxyl compound, e.g., pentaerythritol; and combinations thereof. One particularly preferred dispersant combination is a combination of (A) polyisobutylene substituted with succinic anhydride groups and reacted with (B) a hydroxy compound, e.g., pentaerythritol; (C) a polyoxyalkylene polyamine, e.g., polyoxypropylene diamine, or (D) a polyalkylene diamine, e.g., polyethylene diamine and tetraethylene pentamine using about 0.3 to about 2 moles of (B), (C) and/or (D) per mole of (A). Another preferred dispersant combination comprises a combination of (A) polyisobutenyl succinic anhydride with (B) a polyalkylene polyamine, e.g., tetraethylene pentamine, and (C) a polyhydric alcohol or polyhydroxy-substituted aliphatic primary amine, e.g., pentaerythritol or trismethylolaminomethane, as described in U.S. Pat. No. 3,632,511.

Such ashless dispersants can be further post treated by a variety of conventional post treatments such as boration, as generally taught in U.S. Pat. Nos. 3,087,936 and 3,254,025. Boration of the dispersant is readily accomplished by treating an acyl nitrogen-containing dispersant with a boron compound such as boron oxide, boron halide, boron acids, and esters of boron acids, in an amount sufficient to provide from about 0.1 to about 20 atomic proportions of boron for each mole of acylated nitrogen composition. Useful dispersants contain from about 0.05 to about 2.0 wt. %, e.g., from about 0.05 to about 0.7 wt. % boron. The boron, which appears in the product as dehydrated boric acid polymers (primarily $(HBO_2)_3$), is believed to attach to the dispersant bis-imides and diimides as amine salts, e.g., the metaborate salt of the diimide. Boration can be carried out by adding from about 0.5 to 4 wt. %, e.g., from about 1 to about 3 wt. % (based on the weight of acyl nitrogen compound) of a boron compound, preferably boric acid, usually as a slurry, to the acyl nitrogen compound and heating with stirring at from about 135° C. to about 190° C., e.g., 140° C. to 170° C., for from about 1 to about 5 hours, followed by nitrogen stripping. Alternatively, the boron treatment can be conducted by adding boric acid to a hot reaction mixture of the dicarboxylic acid material and amine, while removing water. Other post reaction processes known in the art can also be applied.

EXAMPLE 1

In a simultaneous chlorination/maleation process for the production of chlorine induced polyisobutylene-substituted succinic anhydride (PIBSA), PIB and a molar equivalent of maleic anhydride are mixed and chlorine is bubbled through the reaction mixture while the reaction temperature is increased from 120° C. to about 200° C. The reaction mixture is allowed to soak for 4 to 6 hours and stripped at 200° C. to about 220° C. to eliminate unreacted maleic anhydride. A typical PIBSA produced from 2225 Mn PIB, and having a succination ratio of 1.2 and has a chlorine content of about 0.2 to 0.3 wt. %.

EXAMPLE 2

1300 g of PIBSA (saponification (SAP) no. 48.7, 1900 ppm Cl) was charged into a 5 liter reactor and mixed with 65 g of maleic anhydride. While stirring under nitrogen, the reaction mixture was heated to 220° C. over a period of 1 hour. The content of the reactor was allowed to soak at 220° C. for 6 hours with nitrogen sweeping. A pH/ammonia test indicated the evolution of HCl during the heating period. HCl evolution was greatest during the first two hours, and diminished during the remainder of the soaking period. After soaking, the product was stripped with nitrogen for 1 hour. A comparison between the untreated PIBSA (Example 1) and the treated PIBSA of Example 2 is shown in Table 1. As is demonstrated by the data, the treated PIBSA had reduced chlorine content and an increased saponification number.

TABLE 1

| Example No. | Example 1 | Example 2 |
| --- | --- | --- |
| MA Charge |  | 5.0% |
| Reaction Temperature |  | 220 C. |
| Reaction Time |  | 6 hrs |
| SAP | 48.7 | 55.9 |
| Chlorine Content | 1900 | 790 |

EXAMPLES 3 THROUGH 6

The succination rate, expressed as a saponification number, of the PIBSA of Example 1 was varied and the resulting PIBSA products were subjected to the same post-treatment as in Example 2. Comparisons between the raw PIBSA and the corresponding post-treated PIBSA are shown below in Tables 2 and 3. Again, as is shown by the data, the treated PIBSA has a reduced chlorine content and an increased saponification number compared to the corresponding raw PIBSA product.

TABLE 2

| Example No. | Example 3 | Example 4 |
| --- | --- | --- |
| MA Charge |  | 4.0% |
| Reaction Temperature |  | 220 C. |
| Reaction Time |  | 5 hrs |
| SAP | 59.42 | 64.1 |
| Chlorine Content | 3260 | 1600 |

TABLE 3

| Example No. | Example 5 | Example 6 |
| --- | --- | --- |
| MA Charge |  | 5.0% |
| Reaction Temperature |  | 220 C. |
| Reaction Time |  | 6 hrs |
| SAP | 57.3 | 67.4 |
| Chlorine Content | 3850 | 1640 |

The following Examples demonstrate the additional improvements achieved by treating the polyolefin-substituted carboxylic acylating agent with excess α,β-unsaturated carboxylic reactant in the presence of an alkyl benzene sulfonic acid sediment reducing agent.

EXAMPLES 7 THROUGH 10

400 g of PIBSA (SAP No. 46.18, 1200 ppm Cl) was charged into a 5 liter reactor and mixed with minor amounts of maleic anhydride (MA) and/or an alkyl benzene sulfonic acid (SA). While stirring under nitrogen, the temperature of the reaction mixture was raised to 220° C. over a period of 1 hour. The content of the reactor was allowed to soak at 220° C. for 6 hours with nitrogen sweeping. A pH/ammonia test indicated the evolution of HCl during the heating period. HCl evolution was greatest during the first two hours, and diminished during the remainder of the soaking period. After soaking, the product was stripped with nitrogen for 1 hour. Sediment was measured using a 50/50 heptane sediment test. Results are shown in Tables 4 through 6.

TABLE 4

| Example No. | 7 | 8 | 9 | 10 |
| --- | --- | --- | --- | --- |
| PIBSA SAP (start) | 46.18 | 46.18 | 46.18 | 46.18 |
| MA Charge |  | 1.0% | 3.0% | 0.0% |
| SA Charge |  | 0.0% | 0.0% | 0.0% |
| SAP |  | 48.81 | 56.28 | 44.97 |
| PPM Cl | 920 | 840 | 790 | 810 |
| Sed. (50/50) | Trace | 0.01 | 0.18 | 0.01 |
| Soak Temp. (° C.) |  | 220 | 220 | 220 |
| Soak Time |  | 4 hrs | 4 hrs | 4 hrs |

The data of Table 4 show that treatment with maleic anhydride (Examples 8 and 9) leads to an increase in the saponification number (SAP) as well as a reduction in chlorine content. However, when the amount of maleic anhydride is raised to 3%, based on the weight of charged PIBSA, the level of sediment rises. Thus, absent some solution to the sediment problem, a product formed by post-treatment of PIBSA with maleic anhydride may need to be subjected to a filtration step. Example 10 demonstrates that heating PIBSA in the absence of additional maleic anhydride leads to an actual reduction in SAP due to the decarboxylation of the PIBSA.

TABLE 5

| Example No. | 11 | 12 | 13 |
|---|---|---|---|
| PIBSA SAP (start) | 57.86 | 57.86 | 57.86 |
| MA Charge | | 0.0% | 0.0% |
| SA Charge | | 0.2% | 0.4% |
| SAP, 4 hrs | | 56.62 | 56.38 |
| SAP, 6 hrs | | 54.68 | 55.07 |
| PPM Cl(start) | 1350 | 1350 | 1350 |
| PPM Cl, 4 hrs | | 980 | 830 |
| PPM Cl, 6 hrs | | 910 | 810 |
| % Cl decrease 4 hrs | | 27.4% | 38.5% |
| % Cl decrease 6 hrs | | 32.6% | 40.0% |
| Sed, vol % (start) | 0.10% | 0.10% | 0.10% |
| Sed, vol %, 4 hrs | | 0.06% | 0.09% |
| Sed, vol %, 6 hrs | | 0.10% | 0.10% |

The data of Table 5 indicate that chlorine content of the PIBSA decreased about 27–33% in 4 hours due to heat soaking in the presence of 0.2% sulfonic acid, and about 38–49% after 6 hours of heat soaking in the presence of 0.4% sulfonic acid, with no change in sediment volume. As the post-treatment of PIBSA with sulfonic acid alone does not reduce the level of sediment, this demonstrates that sulfonic acid and maleic anhydride have a synergistic effect in producing low sediment PIBSA.

TABLE 6

| Example No. | 14 | 15 | 16 | 17 | 18 |
|---|---|---|---|---|---|
| PIBSA SAP (start) | 46.18 | 46.18 | 46.18 | 46.18 | 46.18 |
| SA Charge | | 0.20% | 0.20% | 0.20% | 0.20% |
| MA Charge | | 1.0% | 2.0% | 3.0% | 4.0% |
| SAP (4 hrs) | | 48.52 | 53.21 | 53.6 | 56.54 |
| PPM Cl | 1200 | 740 | 660 | 690 | 650 |
| % Cl decrease | | 38.3% | 45.0% | 42.5% | 45.8% |
| Sed. Vol % | Trace | 0.01 | 0.03 | 0.02 | 0.09 |

The data of Table 6 demonstrate that by heat-soaking PIBSA with 3% MA, the chlorine content can be reduced and the SAP can be increased simultaneously, with a level of sediment formation that does not require product filtration.

EXAMPLES 18 THROUGH 23

200 grams of the PIBSA of Examples 1 through 6 were diluted with mineral oil (S150N) and heated under nitrogen blanket to about 140–145° C. Ethylenepolyamine (PAM) was added slowly while controlling foaming caused by the water of reaction with the addition of PAM. The reaction mixture was soaked at 155° C. for two hours under nitrogen atmosphere. The reaction product was then stripped with nitrogen for thirty minutes. The properties of the dispersants thus formed are shown in Table 7.

TABLE 7

| Example No. | 18 | 19 | 20 | 21 | 22 | 23 |
|---|---|---|---|---|---|---|
| PIBSA Ex. No. | 1 | 2 | 3 | 4 | 5 | 6 |
| PIBSA, grams | 200 | 200 | 200 | 200 | 200 | 200 |
| PAM, grams | 9.9 | 11.4 | 12.1 | 13.0 | 12.0 | 13.7 |
| Disp. Wt. % N | 0.91 | 1.02 | 1.10 | 1.16 | 1.05 | 1.16 |
| Disp. Cl PPM | 1050 | 440 | 1800 | 910 | 2010 | 880 |

EXAMPLES 24 THROUGH 27

Preformed PIBSA products were post-treated with 1 wt. % maleic anhydride at 220° C., for 4 hours. The resulting reduction in chlorine content, (at relatively constant saponification no.) is shown below in Table 8.

TABLE 8

| Example No. | 24 | 25 | 26 | 27 |
|---|---|---|---|---|
| MA Charge | 0 | 1% | 0 | 1% |
| SAP | 48.7 | 47.4 | 45.0 | 47.0 |
| PPM Cl | 2000 | 1230 | 2072 | 810 |
| Sediment vol. % | Trace | Trace | Trace | Trace |

EXAMPLE 28

300 grams of the PIBSA of example 24 were diluted with mineral oil (S100N) and heated under nitrogen blanket to about 140–145° C. Ethylenepolyamine (PAM) was added slowly while controlling foaming caused by the water of reaction with the addition of PAM. The reaction mixture was soaked at 150° C. for two hours under nitrogen atmosphere and the temperature was raised to 160° C. While maintaining the temperature at 160° C., 23.2 grams of 30% boric acid slurry in S150N were added slowly, controlling the foaming with the slurry addition. Upon completion of the addition of the boric acid slurry, the reaction mixture was soaked at 160–163° C. for two hours. The product was stripped under nitrogen for half-hour. The resulting dispersant analyzed for 0.90 wt. % N, 1210 PPM Cl, and 0.24 wt. % B. The 50/50 heptane solution contained about 0.01% vol sediment.

EXAMPLE 29

300 grams of the PIBSA of example 25 were diluted with mineral oil (S100N) and heated under nitrogen blanket to about 140–145° C. Ethylenepolyamine (PAM) was added slowly while controlling foaming caused by the water of reaction with the addition of PAM. The reaction mixture was soaked at 150° C. for two hours under nitrogen atmosphere and the temperature was raised to 160° C. While maintaining the temperature at 160° C., a boric acid slurry in S150N mineral oil was added slowly, controlling the foaming with the slurry addition. Upon completion of the addition of the boric acid slurry, the reaction mixture was soaked at 160–163° C. for two hours. The product was stripped under nitrogen for half-hour. The resulting dispersant analyzed for 0.90 wt. % N, 760 PPM Cl, and 0.24 wt. % B. The 50/50 heptane solution contained about 0.01% vol sediment.

EXAMPLE 30

300 grams of the PIBSA of example 26 were diluted with mineral oil (S100N) and heated under nitrogen blanket to about 140–145° C. Ethylenepolyamine (PAM) was added slowly while controlling foaming caused by the water of reaction with the addition of PAM. The reaction mixture was soaked at 150° C. for two hours under nitrogen atmosphere and the temperature was raised to 160° C. While maintaining the temperature at 160° C., a boric acid slurry in S150N mineral oil was added slowly, controlling the foaming with the slurry addition. Upon completion of the addition of the boric acid slurry, the reaction mixture was soaked at 160–163° C. for two hours. The product was stripped under nitrogen for half-hour. The resulting dispersant analyzed for 0.89 wt. % N, 1310 PPM Cl, and 0.24 wt. % B. The 50/50 heptane solution contained about 0.01% vol sediment.

EXAMPLE 31

300 grams of the PIBSA of example 27 were diluted with mineral oil (S100N) and heated under nitrogen blanket to about 140–145° C. Ethylenepolyamine (PAM) was added slowly while controlling foaming caused by the water of reaction with the addition of PAM. The reaction mixture was soaked at 150° C. for two hours under nitrogen atmosphere and the temperature was raised to 160° C. While maintaining the temperature at 160° C. a boric acid slurry in S150N mineral oil was added slowly, controlling the foaming with the slurry addition. Upon completion of the addition of the boric acid slurry, the reaction mixture was soaked at 160–163° C. for two hours. The product was stripped under nitrogen for half-hour. The resulting dispersant analyzed for 0.90 wt. % N, 510 PPM Cl, and 0.23 wt. % B. The 50/50 heptane solution contained about 0.01% vol sediment.

EXAMPLE 32

To demonstrate the effect of blade design and mixing energy on chlorine content, a study was performed in a (nominally) 6-gallon reactor provided with a high speed mixer. The ratio of the diameter of the mixer impeller to reactor diameter varied from 0.39 to 0.54. The reactor contained 4 internal baffles with a baffle width to reactor diameter ratio that varied from 0.02 to 0.073. The mixers operated between 250–1500 rpm. At these mixing speeds, approximately 5–150 HP/1000 gallons of mixing energy is input to the reactor contents.

15.5 kg of 2225 Mn polyisobutelyene is charged into the reactor with an amount of maleic anhydride equivalent to 1.2–1.8 moles of maleic anhydride per mole of polymer. The mixture is heat to 140° C. and mixed for one hour. Chlorine is added to the reactor contents via a dip tube over a period of 5–9 hours at temperatures ranging form 140° C. to 220° C. The total chlorine charge is equivalent to 1.0 to 2.0 moles of chlorine per mole of maleic anhydride charged. When chlorination is complete, the reactor contents are heated to 220° C. and soaked for 0–4 hours at 220° C. The contents are then stripped with nitrogen until all the unreacted free maleic is removed. The entire process is performed with the reactor contents under mixing conditions as described above.

FIG. 1 plots the analytical results. The plot shows the residual chlorine as a function of the chlorine to polymer molar ratio ($Cl_2$/PIB MR) charged to the reactor. This plot establishes the general trend of residual chlorine for the two different mixing systems. At a molar ratio of 1.5, using the approximate trend lines, the dual pitched blade system (PBT) shows an approximately 19% reduction in PIBSA residual chlorine content over the pitched blade/disk flat blade turbine system (DFBT).

EXAMPLES 33 TO 38

Dispersants were prepared from PIBSA and either a polyamine, or a heavy polyamine mixture using high speed mixing. The data of Table 9 show that the chlorine content of the PIBSA, and the dispersant derived therefrom, relates to the mixing energy (HP/1000 gal.) applied during the maleation/chlorination step. Generally, higher mixing energy correlated with lower chlorine content of both the PIBSA and the dispersant derived therefrom, using either the PBT or DFBT impeller configuration.

TABLE 9

| Example No. | 33 | 34 | 35 | 36 | 37 | 38 |
| --- | --- | --- | --- | --- | --- | --- |
| PIBSA SAP | 56 | 54 | 54 | 60 | 60 | 55 |
| PIBSA Sed. Vol. % | 0.02 | trace | trace | 0.01 | 0.01 | 0.03 |
| PPM Cl | 980 | 770 | 770 | 1120 | 1120 | 1010 |
| Reactor Blade Conf. | PBT | PBT | PBT | DFBT | DFBT | DFBT |
| Diameter | 5.5 | 5.5 | 5.5 | 5.5 | 5.5 | 5.5 |
| RPMs | 350 | 650 | 650 | 650 | 650 | 450 |
| HP/1000 gal. | 15 | 94 | 94 | 65 | 65 | 21 |
| Amine Type | PAM | HPAM | PAM | HPAM | PAM | PAM |
| Amination T, deg C. | 155 | 155 | 155 | 155 | 155 | 155 |
| Amination Soak, min | 120 | 120 | 120 | 120 | 120 | 120 |
| Strip Time, min. | 60 | 60 | 60 | 60 | 60 | 60 |
| Analytical Results | | | | | | |
| Wt. % Nitrogen | 1.20 | 1.14 | 1.21 | 1.25 | 1.30 | 1.19 |
| PPM Cl | 570 | 450 | 450 | 610 | 620 | 570 |
| Sediment vol. % | 0.03 | 0.01 | 0.01 | 0.03 | 0.04 | 0.04 |

EXAMPLES 39 THROUGH 42

PIBSA was charged into a 1 liter reactor and mixed with 0.5 wt. % maleic anhydride (MA). While stirring under nitrogen, the temperature of the reaction mixture was soaked at 220 to 230° C. for 1 to 2 hours, followed by stripping with nitrogen, for one hour, at the same temperature. A pH/ammonia test indicated the evolution of HCl during the heat-soaking. Sediment was measured using a 50/50 heptane sediment test. Results are shown in Table 10.

TABLE 10

| Example No. | 39 | 40 | 41 | 42 |
| --- | --- | --- | --- | --- |
| SAP | 46.9 | 46.9 | 47.3 | 47.1 |
| PPM Cl | 2500 | 800 | 1100 | 900 |
| Sediment Vol. % | 0.005 | 0.005 | 0.005 | 0.0075 |
| Soaking/Stripping Temp (deg. C.) | — | 230 | 220 | 230 |
| Soaking/Stripping Time (hours) | — | 2 | 1 | 1 |

As shown by the data of Table 10, heat soaking in the presence of only 0.5 wt. % MA leads to reductions in chlorine content, with no appreciable increase in sediment (but also no significant increase in SAP).

EXAMPLES 43 TO 45

PIBSA was charged into a 2 liter reactor with 2.0 wt. % maleic anhydride (MA) with, and without, a sediment inhibitor. While stirring under nitrogen, the reactor was pressurized to 3 atm. and the reaction temperature was raised to 200° C. The reactor contents were allowed to soak 2 hours at 200° C. After soaking, the product was vacuum stripped. Sediment was measured using a 50/50 heptane sediment test. Results are shown in Table 11.

TABLE 11

| Example No. | 43 | 44 | 45 |
|---|---|---|---|
| SAP | 46.4 | 49.5 | 50.0 |
| PPM Cl | 2780 | 1500 | 1300 |
| Sediment vol. % | <0.005 | 0.20 | 0.20 |
| SA Charge (%) | — | None | 0.01 |

The data of Table 11 demonstrate that the pressurization of the reactor during post-treatment heat-soaking can lead to further significant reductions in chlorine content. The addition of a sulfonic acid sediment inhibitor provides a still further reduction in chlorine content.

The disclosures of all patents, articles and other materials described herein are hereby incorporated into this specification by reference, in their entirety. The principles, preferred embodiments and modes of operation of the present invention have been described in the foregoing specification. What applicants submit is their invention, however, is not to be construed as limited to the particular embodiments disclosed, since the disclosed embodiments are regarded as illustrative rather than limiting. Changes may be made by those skilled in the art without departing from the spirit of the invention.

What is claimed is:

1. A method for providing a polyolefin-substituted carboxylic acylating agent formed by a chlorine-assisted reaction of a polyolefin and an α,β-unsaturated carboxylic reactant, which polyolefin-substituted carboxylic acylating agent has a reduced chlorine content, said method comprising:

in a first stage, reacting a polyolefin and an α,β-unsaturated carboxylic reactant in the presence of chlorine until substantially all of said polyolefin molecules have reacted with said α,β-unsaturated carboxylic reactant or said chlorine; and in a second stage, heating the polyolefin-substituted carboxylic acylating agent reaction product having a residual chlorine content formed in said first stage with additional α,β-unsaturated carboxylic reactant, in the absence of further added chlorine for a time sufficient to allow at least a portion of said additional α,β-unsaturated carboxylic reactant to displace residual chlorine in said polyolefin-substituted carboxylic acylating agent reaction product.

2. The method of claim 1, wherein, in said first stage, said polyolefin is reacted with said α,β-unsaturated carboxylic reactant at a temperature of from 60 to 250° C., and in said second stage, said polyolefin-substituted carboxylic acylating agent reaction product of the first stage with said excess α,β-unsaturated carboxylic reactant are heated together at a temperature of from 180 to 250° C. for a time period of for 0.5 to 10 hours.

3. The method of claim 2, wherein in said first stage, said polyolefin is reacted with said α,β-unsaturated carboxylic reactant as the temperature is raised from an initial temperature of from about 100 to 120° C. to a higher temperature of about 180 to 250° C., and wherein at least about 70 wt. % of said chlorine is introduced into the reaction mixture before the temperature of said reaction mixture reaches 170° C.

4. The method of claim 1, wherein said α,β-unsaturated carboxylic reactant is selected from one or more of monounsaturated $C_3$ to $C_{10}$ monocarboxylic acids and monounsaturated $C_4$ to $C_{10}$ dicarboxylic acids and anhydrides and $C_1$ to $C_5$ alcohol derived mono- or diesters thereof.

5. The method of claim 1, wherein said α,β-unsaturated carboxylic reactant is maleic anhydride.

6. The method of claim 3, wherein said polyolefin comprises a homopolymer or copolymer of one or more of ethylene and $C_3$ to $C_{28}$ alpha olefin.

7. The method of claim 3, wherein said polyolefin is polyisobutene.

8. The method of claim 1, wherein α,β-unsaturated carboxylic reactant is introduced subsequent to the substantial completion of the first stage reaction in an amount of from about 0.1 to 10% of the weight of polyolefin-substituted carboxylic acylating agent reaction product.

9. The method of claim 8, wherein α,β-unsaturated carboxylic reactant is introduced subsequent to the substantial completion of the first stage reaction in an amount of from about 1 to 3% of the weight of polyolefin-substituted carboxylic acylating agent reaction product.

10. The method of claim 1, wherein α,β-unsaturated carboxylic reactant is introduced prior to or during the first stage reaction as excess α,β-unsaturated carboxylic reactant in an amount of from about 0.1 to 10% greater than the amount of α,β-unsaturated carboxylic reactant needed to form the polyolefin-substituted carboxylic acylating agent reaction product.

11. The method of claim 10, wherein α,β-unsaturated carboxylic reactant is introduced prior to or during the first stage reaction as excess α,β-unsaturated carboxylic reactant in an amount of from about 1 to 3% greater than the amount of α,β-unsaturated carboxylic reactant needed to form the polyolefin-substituted carboxylic acylating agent reaction product.

12. The method of claim 3, wherein said polyolefin-substituted carboxylic acylating agent reaction product of said second stage has a functionality of at least 1.3.

13. The method of claim 1, wherein said polyolefin-substituted carboxylic acylating agent having a residual chlorine content is heated in the presence of said excess α,β-unsaturated carboxylic reactant in the further presence of 0.05 to 1 wt. % of an oil soluble organic acid, based on the weight of polyolefin-substituted carboxylic acylating agent.

14. The method of claim 13, wherein said organic acid is sulfonic acid.

15. The method of claim 14, wherein said sulfonic acid is present during the reaction of said first stage.

16. The method of claim 1, wherein the reactants of at least one of said first stage and said second stage are mixed using a mixer applying from about 5 to 100 HP/1000 gallons of mixing energy to the reaction mixture.

17. The method of claim 16, wherein said mixer applies from about 30 to 40 HP/1000 gallons of mixing energy to the reaction mixture.

18. The method of claim 1, wherein the reactants of at least one of said first stage and said second stage are mixed using a mixer equipped with a dual pitch blade.

19. The method of claim 18, wherein said mixer applies from 5 to 100 HP/1000 gallons of mixing energy to the reaction mixture.

20. The method of claim 1, wherein said second stage of the reaction is conducted at a pressure of from about 1 to about 5 atmospheres.

21. The method of claim 1, wherein the polyolefin-substituted carboxylic acylating agent reaction product of said second stage is derivatized with a nucleophilic reactant.

22. The method of claim 21, wherein said nucleophilic reactant is selected from the group consisting of amine, amino-alcohol, alcohol, metal compound and mixtures thereof.

* * * * *